US012806752B2

(12) United States Patent
Lee et al.

(10) Patent No.: US 12,806,752 B2
(45) Date of Patent: Nov. 24, 2026

(54) FASTENER-DRIVING TOOL WITH CHAMBER MEMBER RETAINING ASSEMBLY

(71) Applicant: Illinois Tool Works Inc., Glenview, IL (US)

(72) Inventors: Chaemoon Lee, Glenview, IL (US); Michael S. Popovich, Bartlett, IL (US); Robert R. Schaser, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/215,847

(22) Filed: May 22, 2025

(65) Prior Publication Data

US 2026/0027686 A1 Jan. 29, 2026

Related U.S. Application Data

(60) Provisional application No. 63/656,935, filed on Jun. 6, 2024.

(51) Int. Cl.
*B25C 1/08* (2006.01)
*B25C 1/00* (2006.01)

(52) U.S. Cl.
CPC ................ *B25C 1/08* (2013.01); *B25C 1/008* (2013.01)

(58) Field of Classification Search
CPC ...... B25C 1/08; B25C 1/008; B25C 1/00–188
See application file for complete search history.

(56) References Cited

U.S. PATENT DOCUMENTS 6,123,241 A * 9/2000 Walter .................... B25C 1/008 227/8
6,145,724 A * 11/2000 Shkolnikov ............... B25C 1/08 227/8
6,543,664 B2 * 4/2003 Wolfberg ................ B25C 1/008 227/8
6,592,014 B2 * 7/2003 Smolinski ............... B25C 1/005 227/8
6,666,366 B2 * 12/2003 Rosenbaum .............. B25C 1/08 227/8
6,705,501 B2 3/2004 Miller et al.
6,755,159 B1 * 6/2004 Adams ...................... B25C 1/08 123/46 R
6,783,045 B2 * 8/2004 Shima ....................... B25C 1/08 227/8
6,889,885 B2 5/2005 Ohmori
6,983,871 B2 1/2006 Shima et al.
(Continued)

FOREIGN PATENT DOCUMENTS

EP 1713620 B1 4/2008

OTHER PUBLICATIONS

Extended European Search Report from European Application No. 25179986.2, dated Oct. 24, 2025 (9 pages).

*Primary Examiner* — Dariush Seif
(74) *Attorney, Agent, or Firm* — Adam H. Masia

(57) ABSTRACT

A combustion-powered fastener-driving tool that includes a chamber member retainer assembly configured to enable the controller of the tool to prevent the chamber member of the tool from moving to an open unsealed position and to ensure the tool's combustion chamber remains sealed until the piston fully returns to its pre-firing position.

20 Claims, 13 Drawing Sheets

(56) References Cited

U.S. PATENT DOCUMENTS 6,996,476 B2 2/2006 Najarian
7,163,134 B2 * 1/2007 Moeller .................... B25C 1/08 227/8
7,182,236 B1 2/2007 Wen
7,201,301 B2 * 4/2007 Moeller .................... B25C 1/08 227/8
7,383,974 B2 * 6/2008 Moeller .................... B25C 1/08 227/8
7,487,898 B2 * 2/2009 Moeller .................... B25C 1/08 227/19
7,673,779 B2 * 3/2010 Moeller .................... B25C 1/08 227/8
7,784,560 B2 * 8/2010 Mina ....................... B25C 1/047 173/171
8,070,031 B2 * 12/2011 Moeller .................... B25C 1/08 227/10
8,191,751 B2 * 6/2012 Moeller .................... B25C 1/08 227/8
8,336,749 B2 * 12/2012 Largo ........................ B25C 1/08 123/46 SC
8,636,185 B2 * 1/2014 Largo ...................... B25C 1/005 227/136
8,770,456 B2 * 7/2014 Moeller .................... B25C 1/08 227/8
9,114,516 B2 * 8/2015 Porth ........................ B25C 1/08
9,486,906 B2 * 11/2016 Zhao ....................... B25C 1/008
9,486,907 B2 * 11/2016 Birk ........................ B25C 1/008
11,141,845 B2 * 10/2021 Taylor ....................... B25C 1/08
11,794,323 B2 * 10/2023 Moeller .................... B25C 1/08
11,819,989 B2 * 11/2023 Knight .................... B25C 1/047
12,358,112 B2 * 7/2025 Moeller .................. B25C 1/008
2005/0173484 A1 * 8/2005 Moeller .................... B25C 1/08 227/8
2005/0173487 A1 * 8/2005 Moeller .................... B25C 1/08 227/130
2006/0266785 A1 * 11/2006 Moeller .................... B25C 1/08 227/8
2007/0034659 A1 * 2/2007 Moeller .................... B25C 1/08 227/8
2007/0108249 A1 * 5/2007 Moeller .................... B25C 1/08 227/10
2007/0121731 A1 5/2007 Tanizawa et al.
2007/0131731 A1 * 6/2007 Moeller .................... B25C 1/08 227/10
2007/0215669 A1 9/2007 Lee
2008/0017689 A1 * 1/2008 Simonelli ................. B25C 1/06 227/132
2008/0237295 A1 * 10/2008 Adams ...................... B25C 1/08 123/46 SC
2008/0314953 A1 * 12/2008 Moeller ................ B25C 5/1627 227/109
2009/0152316 A1 * 6/2009 Moeller .................... B25C 1/08 227/8
2009/0314817 A1 * 12/2009 Moeller .................... B25C 1/08 227/8
2010/0065602 A1 * 3/2010 Zhao ......................... B25C 1/08 227/9
2010/0243699 A1 * 9/2010 Largo ........................ B25C 1/08 227/10
2010/0258608 A1 * 10/2010 Porth ........................ B25C 1/00 227/138
2011/0204118 A1 * 8/2011 Moeller .................... B25C 1/08 227/8
2012/0097727 A1 * 4/2012 Ricordi ..................... B25C 1/08 227/9
2012/0097730 A1 * 4/2012 Liang ...................... B25C 1/044 227/130
2013/0299546 A1 * 11/2013 Zhao ....................... B25C 1/008 227/8
2013/0300831 A1 11/2013 Mavromatis et al.
2014/0054350 A1 * 2/2014 Pedicini .................... B25C 1/06 227/140
2014/0069981 A1 3/2014 Ricordi et al.
2014/0197220 A1 * 7/2014 Birk .......................... B25C 1/08 227/8
2014/0252060 A1 9/2014 Segura
2015/0102084 A1 * 4/2015 Zhao ......................... B25C 1/08 227/140
2017/0232598 A1 * 8/2017 Largo ...................... B25C 1/008 227/134
2020/0119600 A1 4/2020 Inuzuka
2021/0162572 A1 * 6/2021 Ootsuka .................. B25C 1/043
2022/0288756 A1 * 9/2022 Moeller .................... B25C 1/08
2023/0078054 A1 * 3/2023 Ishikawa ................. B25C 1/047 227/8
2023/0158653 A1 * 5/2023 Moeller .................... B25C 1/08 227/9
2026/0027686 A1 * 1/2026 Lee ........................... B25C 1/08

* cited by examiner

FASTENER-DRIVING TOOL WITH CHAMBER MEMBER RETAINING ASSEMBLY

PRIORITY CLAIM

This patent application claims priority to and the benefit of U.S. Provisional Patent Application No. 63/656,935, filed Jun. 6, 2024, the entire contents of which are incorporated herein by reference.

BACKGROUND

The present disclosure relates to powered fastener-driving tools. Powered fastener-driving tools employ one of several different types of power sources to drive a fastener (such as a nail or a staple) into a workpiece. Powered fastener-driving tools use a power source to drive a piston carrying a driver blade through a cylinder from a pre-firing position to a firing position. As the piston moves to the firing position, the driver blade travels through a nosepiece that guides the driver blade to contact a fastener housed in the nosepiece of the tool. Continued movement of the piston through the cylinder toward the firing position forces the driver blade to drive the fastener out of the nosepiece and into the workpiece. The piston is then forced back to the pre-firing position in a way that depends on the tool's construction and the power source the tool employs. A fastener-advancing device of the tool forces another fastener from a magazine of the tool into the nosepiece, and the tool is ready to fire this next fastener.

Combustion-powered fastener-driving tools are one type of powered fastener-driving tool. A combustion-powered fastener-driving tool uses a small internal combustion assembly as its power source. For various known combustion-powered fastener-driving tools, when an operator depresses a workpiece-contact element ("WCE") of the tool onto a workpiece to move the WCE from an extended position to a retracted position, one or more mechanical linkages cause: (1) a chamber member to move to a sealed position to seal a combustion chamber that is in fluid communication with the cylinder; and (2) a fuel delivery system to dispense fuel from a fuel canister into the (now sealed) combustion chamber. When an operator pulls the trigger, the trigger actuates a trigger switch, thereby causing a spark plug to spark and ignite the fuel/air mixture in the combustion chamber. This generates high-pressure combustion gases that expand and force the piston to move through the cylinder from the pre-firing position (i.e., the resting position) to the firing position, thereby causing the driver blade to contact the fastener housed in the nosepiece and drive the fastener out of the nosepiece and into the workpiece. Just before the piston reaches the firing position, the piston passes exhaust check valves defined by the cylinder, and some of the combustion gases that propel the piston exhaust through these check valves to atmosphere. This combined with heat exchange to the atmosphere and the fact that the combustion chamber remains sealed during firing generates a vacuum pressure above the piston in the combustion chamber and causes the piston to retract to the pre-firing position. When the operator removes the WCE from the workpiece, a spring biases the WCE from the retracted position to the extended position, causing the one or more mechanical linkages to move the chamber member to an unsealed position to unseal the combustion chamber.

One issue with the operation of certain combustion-powered fastener-driving tools can occur if the chamber member moves and the combustion chamber unseals before the piston returns to the pre-firing position. For instance, if the operator removes the WCE from the workpiece after firing but before the piston fully returns to the pre-firing position, this can cause the chamber member to move to the unsealed position and unseal the combustion chamber. When this happens, at least some of the vacuum pressure in the combustion chamber can be lost. This can cause the piston to stop before reaching its pre-firing position, which in turn can cause the tool to not properly function the next time the operator attempts to use the tool to drive the next fastener.

Certain fastener-driving tools have two different types of operational modes and one or more mechanisms that enable the operator to optionally select one of the two different operational modes that the operator desires to use for driving the fasteners. One such operational mode is known in the industry as the sequential or single actuation operational mode. In this operational mode, the actuation of the trigger mechanism will not (by itself) initiate the actuation of the powered fastener driving tool (and the driving of a fastener into the workpiece) unless the WCE is sufficiently depressed against the workpiece. In other words, to operate the powered fastener driving tool in the sequential or single actuation operational mode, the WCE must first be depressed against the workpiece followed by the actuation of the trigger mechanism. Another operational mode is known in the industry as the contact actuation or bump-fire operational mode. In this operational mode, the operator can maintain the trigger mechanism at or in its actuated position, and subsequently, each time the WCE is in contact with and sufficiently pressed against the workpiece, the fastener-driving tool will actuate (thereby driving a fastener into the workpiece).

One issue with various commercially available combustion-powered fastener-driving tools (that are sometimes called cordless framing nailers) is that they operate in the sequential firing mode but do not operate in the bump fire mode. Operating such tools only in the sequential firing mode can lead to operator fatigue.

Accordingly, there is a need for combustion-powered fastener-driving tools that address these issues.

SUMMARY

Various embodiments of the present disclosure provide a combustion-powered fastener-driving tool that address the above issues by including a chamber member retaining assembly that ensures that the chamber member does not move to an unsealed position and the combustion chamber remains sealed until the piston fully returns to its pre-firing position. In various embodiments, the chamber member retaining assembly is controlled by a suitable controller and engageable with the chamber member thereby providing the controller with the ability to prevent certain undesired movement of the chamber member from the sealed position. In various embodiments, the controller includes a processor and memory device, and in various embodiments, the controller includes an electronic circuit.

In various embodiments, the chamber member retaining assembly includes an electromagnet that is energized to directly hold the chamber member in a retained position. The controller of the tool selectively energizes the electromagnet to maintain the chamber member in a retained position. The electromagnet thus selectively prevents the chamber member from moving toward its unsealed position from its sealed position. In various embodiments, the controller de-energizes the electromagnet after a designated amount of time (thereby allowing the chamber member to move to the unsealed position) to give the piston time to fully return to its pre-firing position. This enables the tool to operate in a bump fire mode.

In various embodiments, the electromagnet is part of an electromagnet cartridge assembly. The electromagnet cartridge assembly includes a cartridge, an electromagnet connected to the cartridge, and one or more cartridge connectors that secure the electromagnet cartridge assembly to the housing of the fastener-driving tool.

Additional features and advantages are described in, and will be apparent from, the following Detailed Description and the Figures.

DETAILED DESCRIPTION

Figure 1:
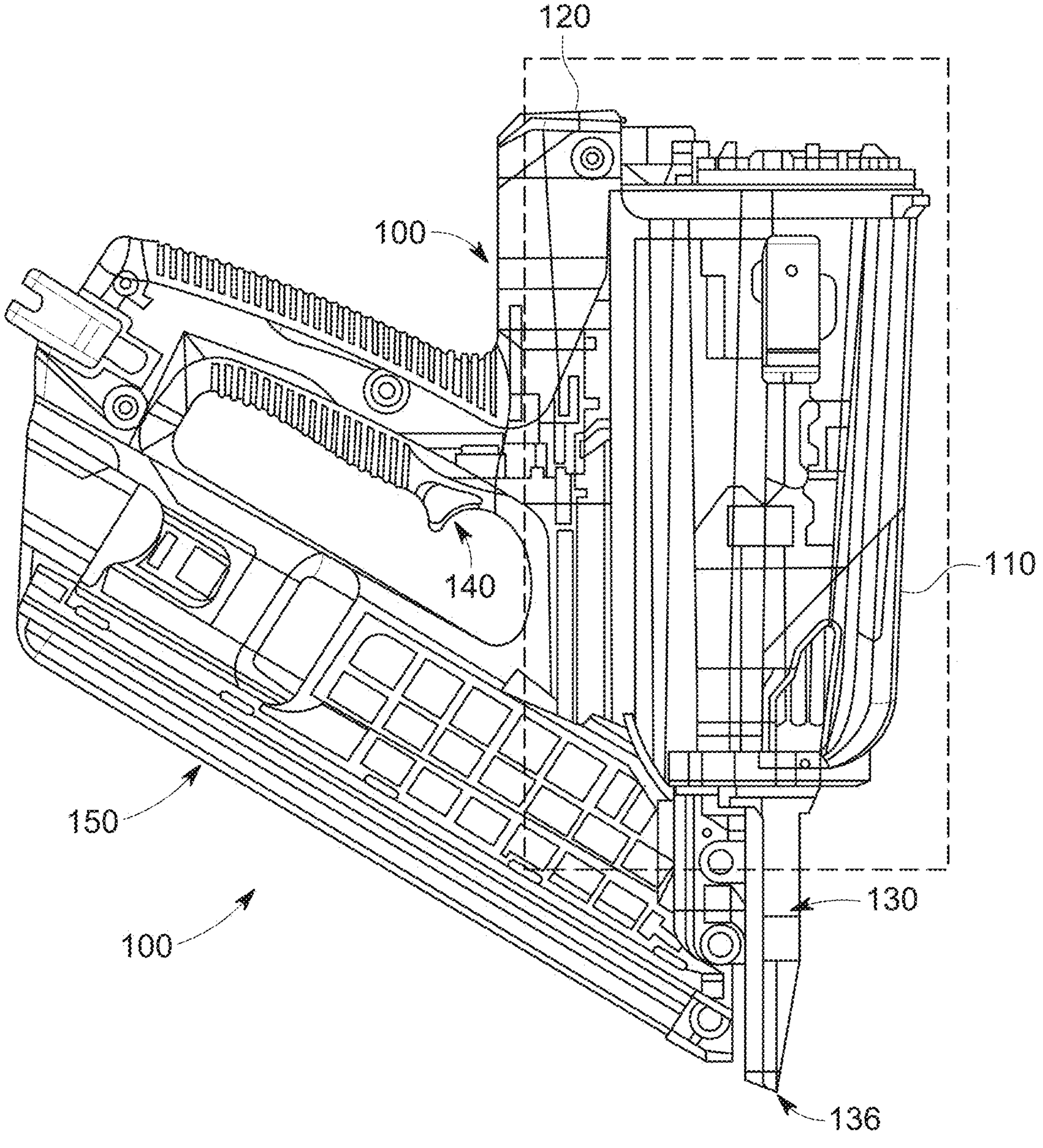
FIG. 1 is a perspective view of a combustion-powered fastener-driving tool that can be configured in accordance with the present disclosure.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Turning now to the figures, FIGS. 1 to 5 illustrate an example combustion-powered fastener-driving tool 100 that can be configured to employ a chamber member retaining assembly in accordance with the present disclosure. The combustion-powered fastener-driving too 100 is sometimes called the "tool" for brevity. The tool 100 generally includes a multi-piece housing 110, a nosepiece assembly 130 including a workpiece-contact element 136 supported by the housing 110, a trigger assembly 140 supported by the housing 110, a fastener magazine 150 supported by the housing 110 and connected to the nosepiece assembly 130, and an internal combustion assembly 200 at least partially within the housing 110.

As best shown in FIGS. 6 to 14, the tool 100 can be configured to include a chamber member retaining assembly 280 connected to and supported by the housing 110. Since certain portions of the fastener-driving tool 100 such as the housing 110, the nosepiece assembly 130, the workpiece-contact element 136, the fuel delivery system (not shown), and the fastener magazine 150 are well-known in the industry, they are only partially shown in certain drawings and are not described in detail herein for brevity.

The internal combustion assembly 200 of the tool 100 includes: (1) a cylinder 210 at least partially within and supported by the housing 110; (2) a piston 220 slidably disposed within the cylinder 210; (3) a driver blade 230 attached to and extending below the piston 220; and (4) a bumper 240 positioned within and at the bottom of the cylinder 210. The piston 220 is attached to the driver blade 230 and is movable relative to the cylinder 210 between a pre-firing position and a firing position. The cylinder 210 includes an exhaust check valve (not shown) near its bottom and defines a vent port 252 below the exhaust check valve. The exhaust check valve 250 and the vent port 252 fluidically connect the cylinder 210 with the atmosphere.

A chamber member 260 (which is sometimes called a valve sleeve in the industry) is at least partially within, supported by, and movable relative to the housing 110. The chamber member 260 partially surrounds the cylinder 210. The chamber member 260 is movable relative to the housing 110, the cylinder head 212, and the cylinder 210 (among other components) between an unsealed position and a sealed position. The chamber member 260, the cylinder head 212, the cylinder 210, and the piston 220 collectively define a combustion chamber (not labeled). When the chamber member 260 is in the sealed position, the combustion chamber is sealed. Conversely, when the chamber member 260 is in the unsealed position, the combustion chamber is unsealed.

A suitable linkage (not shown) connects the chamber member 260 and the workpiece-contact element 136. The workpiece-contact element 136 is movable relative to the housing 110, the cylinder head 212, and the cylinder 210 (among other elements) between an extended position and a retracted position. A biasing element (not shown), such as a spring, biases the workpiece contact element 136 to the extended position. Movement of the workpiece-contact element 136 from the extended position to the retracted position causes the chamber member 260 (via the linkage) to move from the unsealed position (see FIG. 2) to the sealed position (see FIGS. 3, 4, and 5), and vice-versa.

As best shown in FIGS. 6 to 14, in this example embodiment, tool 100 has a chamber member retaining assembly 280 that generally includes a movable plate 500 fixedly connected to and movable with the movable chamber member 260 and a movable electromagnetic cartridge assembly 300 supported by and connected to the housing 110. The electromagnetic cartridge assembly 300 includes: (1) a cartridge 400; (2) an electromagnet assembly 600 connected to and supported by the cartridge 400; (3) a first cartridge connector 340 connected to the cartridge 400; and (4) a second cartridge connector 350 connected to the cartridge 400. The chamber member retaining assembly 280 is configured to selectively hold the chamber member 260 in a retained position under control of the controller (not shown) of the tool 100.

Figure 6:
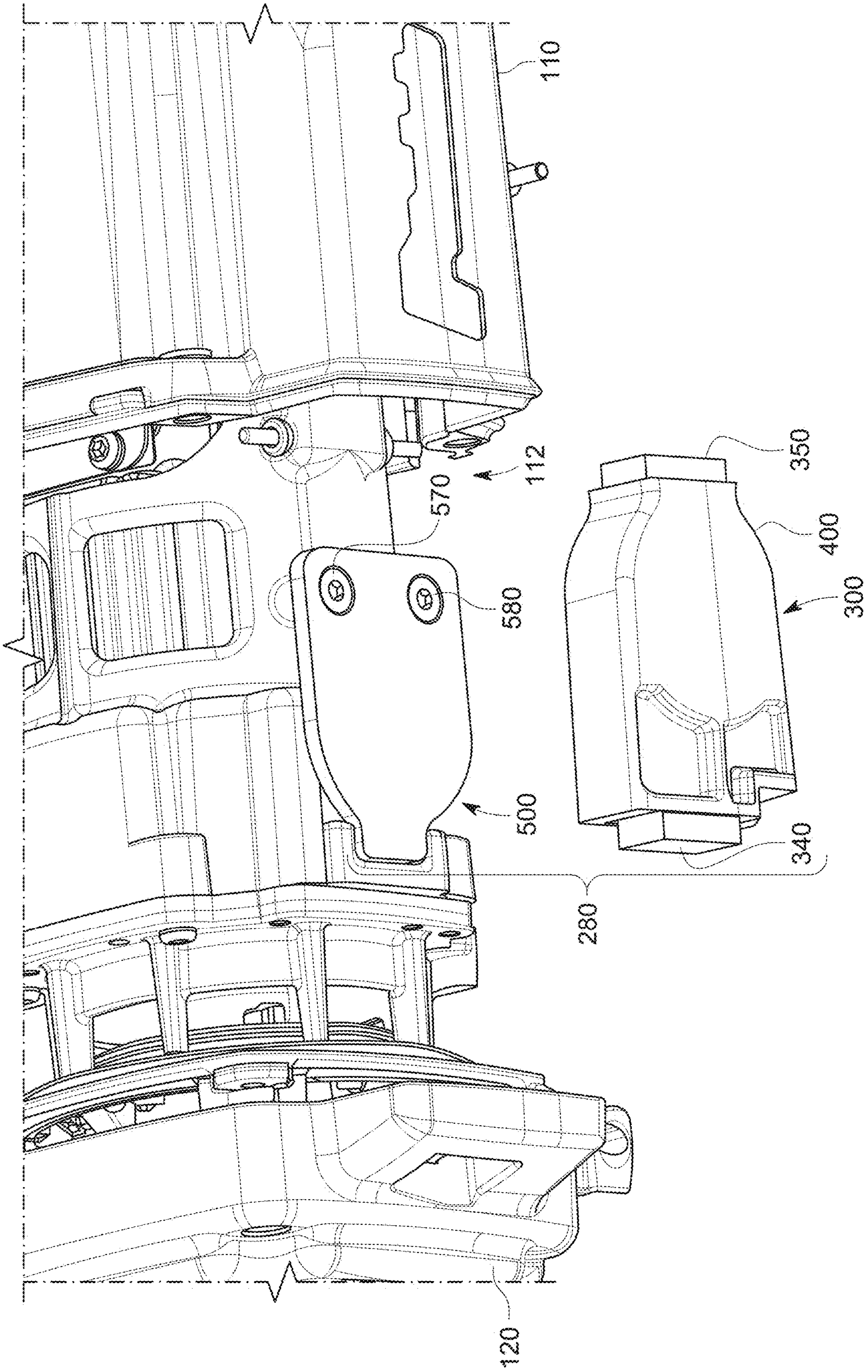
FIG. 6 is a fragmentary partial exploded view of part of a combustion-powered fastener-driving tool (such as but not limited to the tool shown in FIGS. 1 to 5), that is configured to include one example embodiment of the present disclosure and showing part of the housing, part of the cap, part of the chamber member, and the chamber member retaining assembly including the plate and the electromagnet cartridge assembly thereof in accordance with one example embodiment of the present disclosure.
Figure 7:
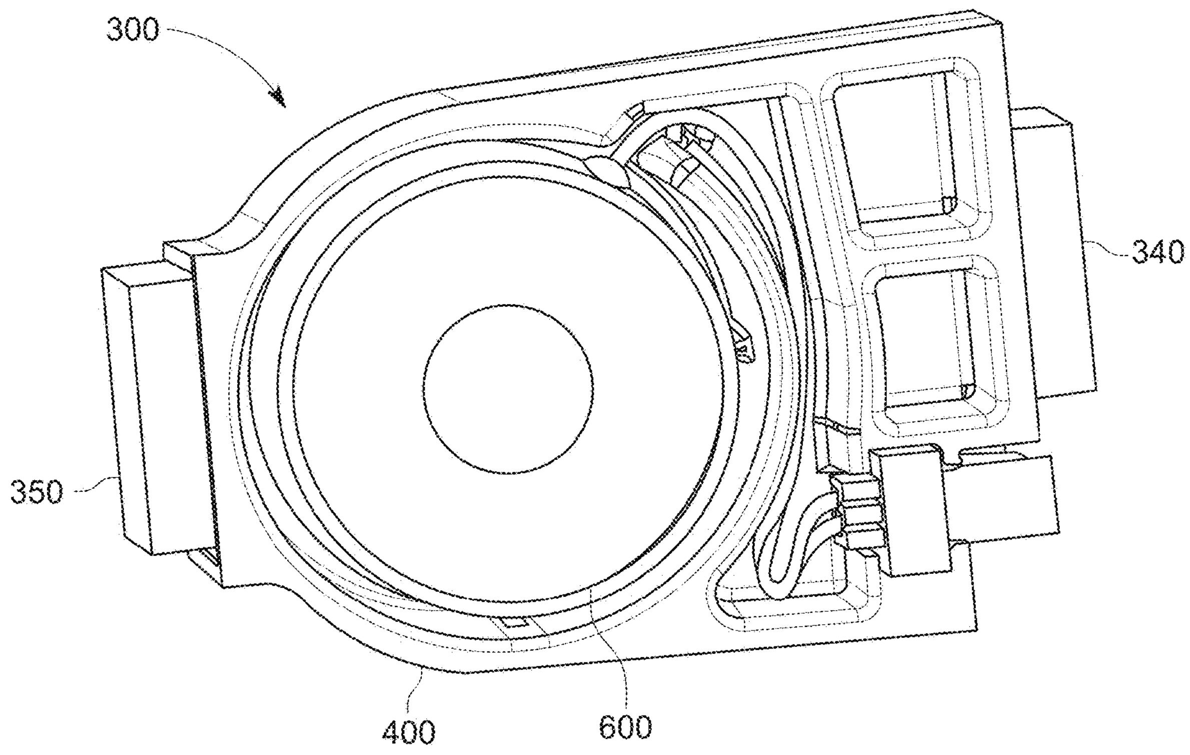
FIG. 7 is an enlarged perspective view of the inner side of the electromagnet cartridge assembly of the chamber member retaining assembly of FIG. 6, shown removed from the housing.
Figure 8:
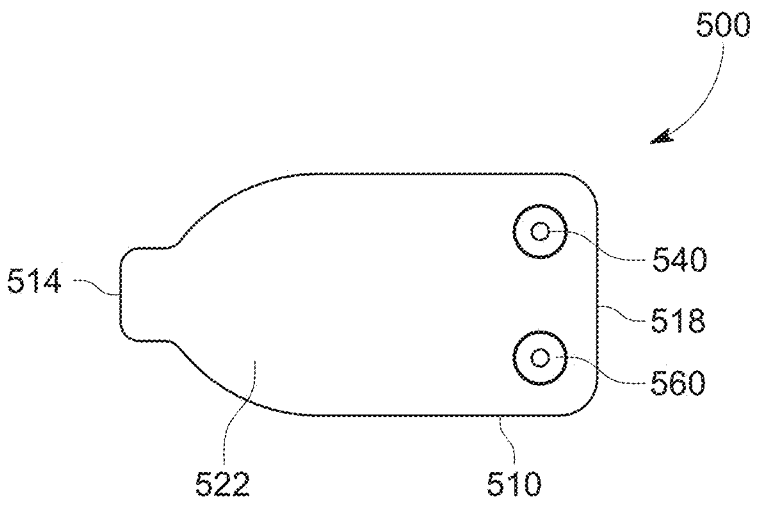
FIG. 8 is an enlarged outer view of the plate of the chamber member retaining assembly of FIG. 6.

More specifically, as best shown in FIGS. 6 and 8, the plate 500 includes a body 510 that includes an inner face (not shown or labeled), an outer face 522, a nose 514, and a tail 518. The body 510 of the plate 500 defines a first mounting hole 540 and a second mounting hole 560, each configured to receive a respective suitable fastener such as fasteners 570 and 580. The first mounting hole 540 and second mounting hole 560 are located toward the tail 518 of the body 510 of the plate 500. The first mounting hole 540 and second mounting hole 560 are each countersunk on the outer face 522 of the body 510 of the plate 500 to accept the head of the respective fastener such that the head of the fastener remains below (sub-flush) to the outer face 522 of the plate 500. The body 510 of the plate 500 is made from a ferrous material in this embodiment. In this example embodiment, the ferrous material is steel. Other suitable ferrous materials can be employed for the plate in accordance with the present disclosure. The plate can be alternatively sized, shaped, positioned, and otherwise configured in accordance with the present disclosure. One example alternative configuration for the plate is described below in connection with FIGS. 15, 16, and 17.

Figure 9:
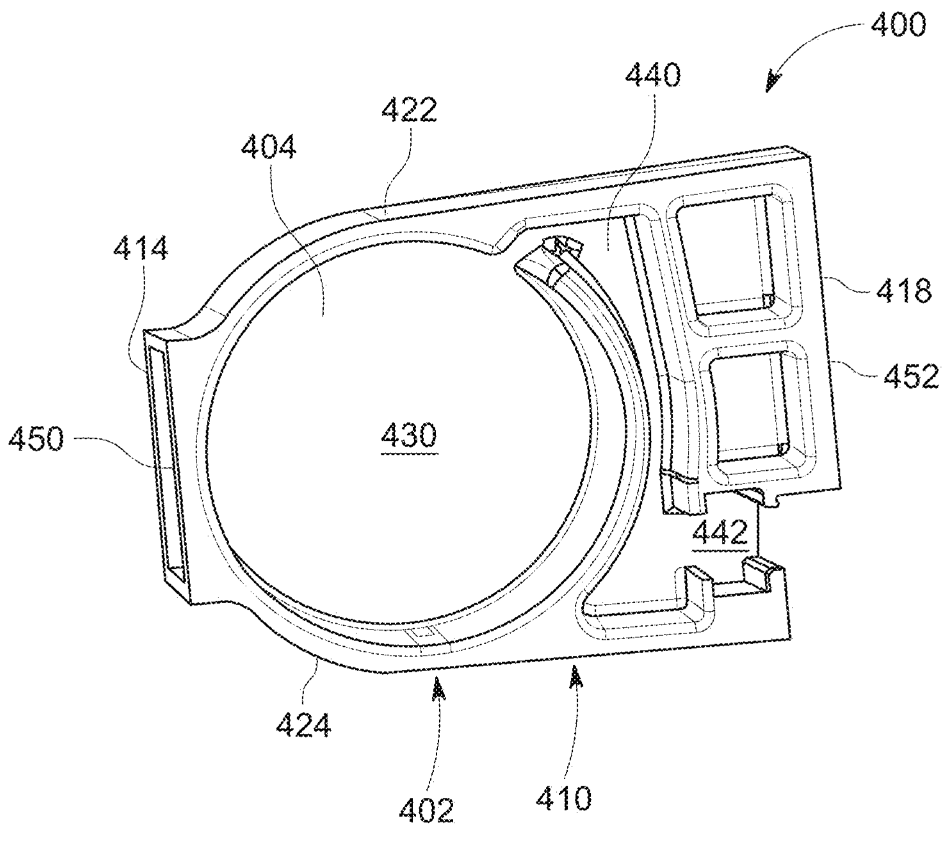
FIG. 9 is an enlarged perspective view of the cartridge of the electromagnet cartridge assembly of the chamber member retaining assembly of FIG. 6.

As best shown in FIG. 9, the cartridge 400 includes a body 402. The body 402 includes a supporting wall 404 and a plurality of walls 410 transversely projecting from the supporting wall 404. The body 402 has a nose 414, a tail 418, a first side 422, and a second side 424. The body 402 of the cartridge 400 including the supporting wall 404 and the walls 410 define a magnet pocket 430, a wire path 440, an electrical connector pocket 442, a first cartridge connector pocket 450, and a second cartridge connector pocket 452 (labeled but not shown). In various embodiments, the body 402 of the cartridge 400 is made from one or more polymeric materials, ferrous metal(s), or nonferrous metal(s) in accordance with the present disclosure.

Figure 10:
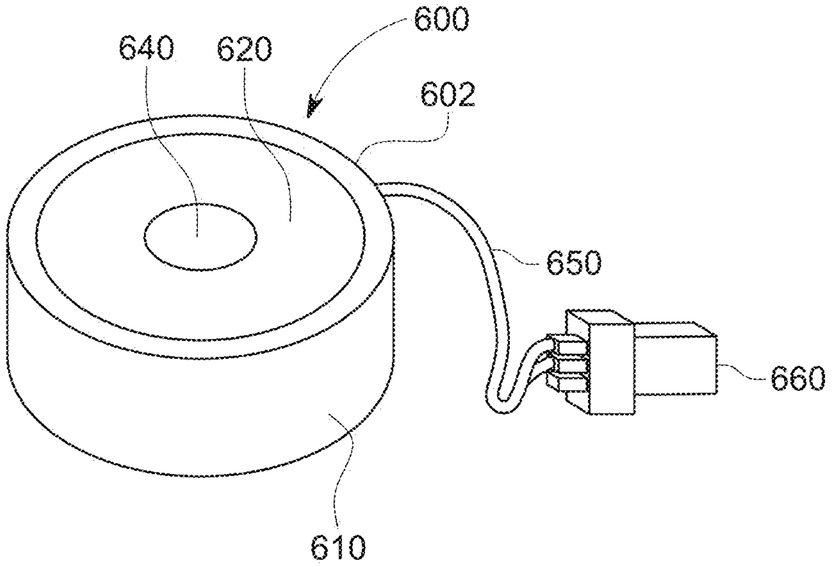
FIG. 10 is an enlarged perspective view of the electromagnet assembly of the electromagnet cartridge assembly of the chamber member retaining assembly of FIG. 6.
Figure 11:
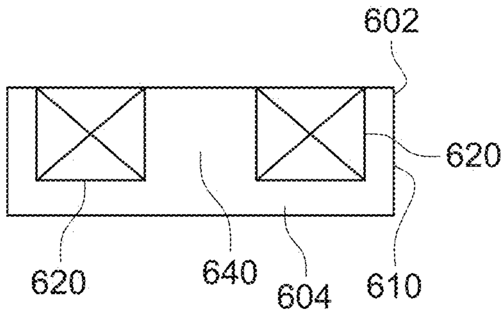
FIG. 11 is a cross-sectional view of the electromagnet assembly of the electromagnet cartridge assembly of the chamber member retaining assembly of FIG. 6.

In the example embodiment as best shown in FIGS. 10 and 11, the electromagnet assembly 600 includes a body 602 having a base wall 604 and outer cylindrical member 610 connected to and extending from the base wall 604. The body 602 supports an inner cylindrical coil 620. The body 602 also includes a core 640 connected to the base wall 604 and disposed inside the coil 620. In one example embodiment, the body 602 is formed from a ferrous material, such as steel. In other example embodiments, the body 602 can be formed of a composite of ferrous and nonferrous materials, for example a polymer containing iron filings. The present disclosure contemplates that the composition of the body 602 can affect the electromagnetic performance of the magnet and thus can vary based on the desired magnetic forces. For example, a greater amount of ferrous material in the body 602 can increase the magnetic force produced by the electromagnet assembly 600, but can also increase its inductance, resulting in a slower response when energized.

In the example embodiment as best shown in FIG. 10, the electromagnet assembly 600 includes a wire 650 having one end suitably connected to the coil 620 and an opposite end connected to a suitable plug 660. The plug is configured to facilitate connection to the controller and specifically to a corresponding connector (not shown) and one or more suitable wires (not shown) connected to the controller of the tool 100.

The cartridge assembly 300 is potted in this example embodiment. More specifically, in this example embodiment, the magnet pocket 430, the wire path 440, and the connector pocket 442 of the cartridge 400 are positioned in the body 602 in the respective pockets and the pockets are filled with an adhesive polymer (not shown) to secure these components of the electromagnet assembly 600 in the body. In this example embodiment, the potting material thus serves to secure the electromagnet assembly 600 to the cartridge 400. In certain example embodiments, the potting material can also serve to provide shock absorption and protect the electromagnet assembly 600 from the environment, such as potential ingress of dust and/or fluids.

The first cartridge connector 340 is partially positioned and secured in (such a via an adhesive) the first cartridge connector pocket 452 of the cartridge 400 and thus supported by the cartridge 400. The first cartridge connector 340 is formed from a resilient compressible material that facilitates certain moves of the cartridge 400. In one example embodiment, the first cartridge connector 340 is a first foam pad. In another example embodiment, the first cartridge connector 340 is formed from rubber or another elastomer. In various example embodiments, the first cartridge connector 340 can be formed of materials having a variety of durometers, to absorb shock and to facilitate displacement of the cartridge assembly 300, such as described below.

The second cartridge connector 350 is partially positioned and secured in (such a via an adhesive) the second cartridge connector pocket 450 of the cartridge 400 and thus supported by the cartridge 400. The second cartridge connector 350 is formed from a resilient compressible material that facilitates certain moves of the cartridge 400. In one example embodiment, the second cartridge connector 350 is a first foam pad. In another example embodiment, the second cartridge connector 350 is formed from rubber or another elastomer. In various example embodiments, the second cartridge connector 350 can be formed of materials having a variety of durometers, to absorb shock and to facilitate displacement of the cartridge assembly 300, such as described below.

FIGS. 6, 12, 13, and 14 show portions of the tool 100 and illustrate how the chamber member retaining assembly 280 is connected to the respective components of the tool 100. The plate 500 is connected to the chamber member 260 by the two fasteners 570 and 580. In other example embodiments, the plate 500 can be connected to the chamber member 260 in other manners, including but not limited to a greater or lesser quantity of fasteners, an adhesive, an interference fit, a snap fit (such as being captured by parts the chamber member 260), a living-hinge style latch, or other suitable mechanism(s). The cartridge assembly 300 is positioned in a cartridge pocket 112 in the housing 110. The cartridge assembly 300 is captured by the cap 120, partially compressing the first and second cartridge connectors 340 and 350.

In this partially compressed state, the first and second cartridge connectors 340 and 350 serve to absorb shock in the axial and transverse directions. The first and second cartridge connectors 340 and 350 are also configured and positioned to bias the cartridge assembly 300 away from the plate 500 such as described below.

Figure 2:
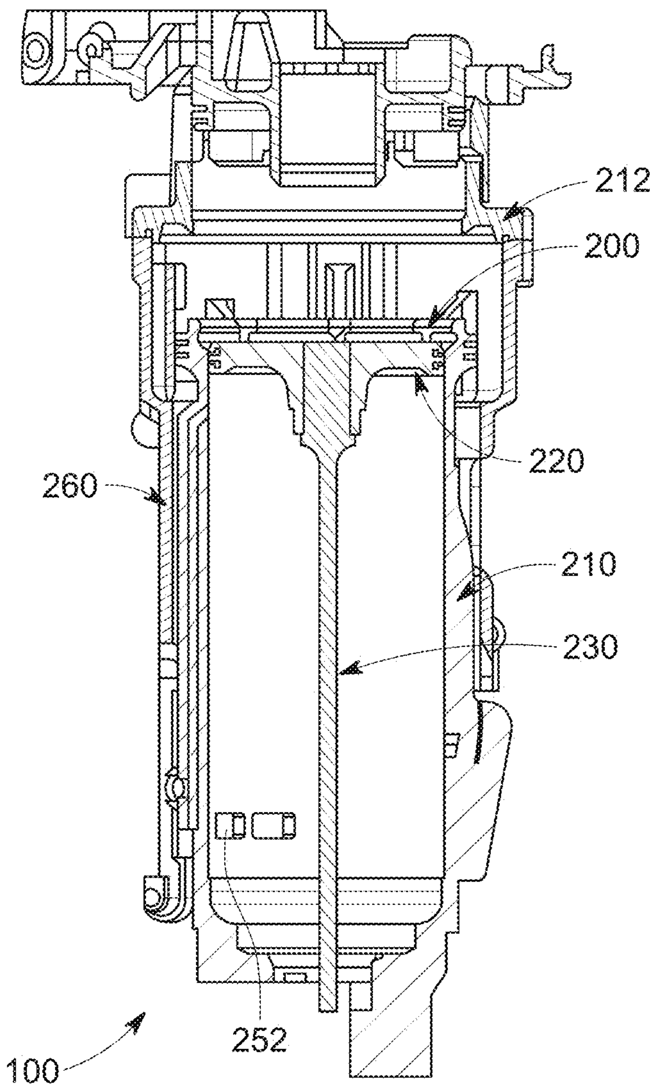
FIG. 2 is a fragmentary partial cross-sectional view of the fastener-driving tool of FIG. 1 in a rest state with the chamber member in an unsealed position, the piston in a fully retracted position, and the chamber member retaining assembly in an inactive state.
Figure 3:
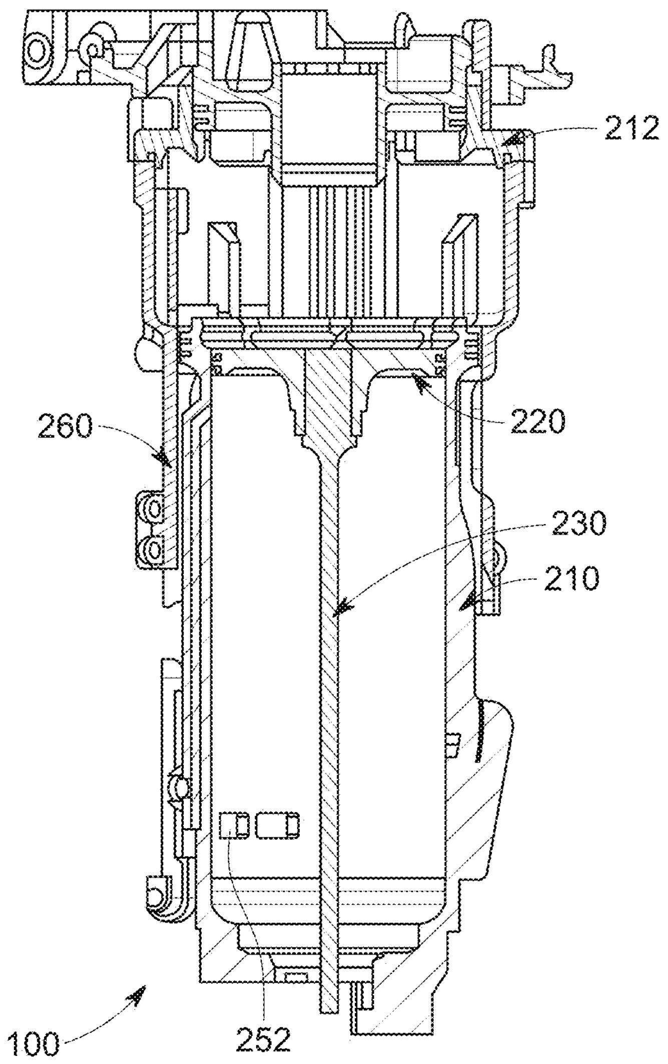
FIG. 3 is a fragmentary partial cross-sectional view of the fastener-driving tool of FIG. 1 in a ready to fire state with the chamber member in a sealed position, the piston in a fully retracted position, and the chamber member retaining member in an inactive state.
Figure 4:
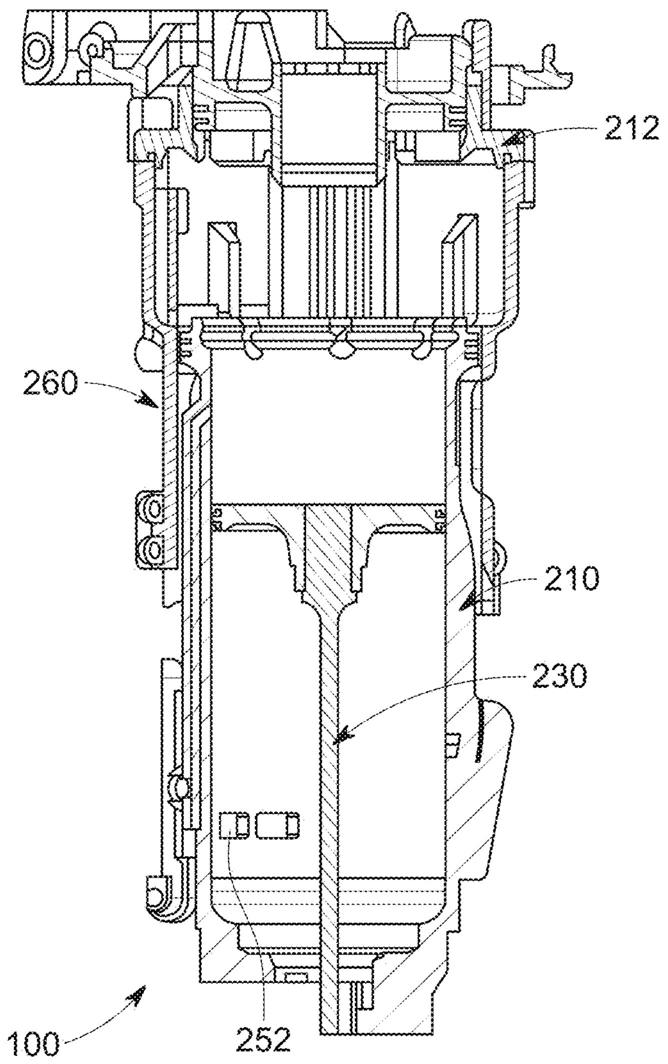
FIG. 4 is a fragmentary partial cross-sectional view of the fastener-driving tool of FIG. 1 that is in a fired state with the chamber member in the sealed position and the electromagnet energized.
Figure 5:
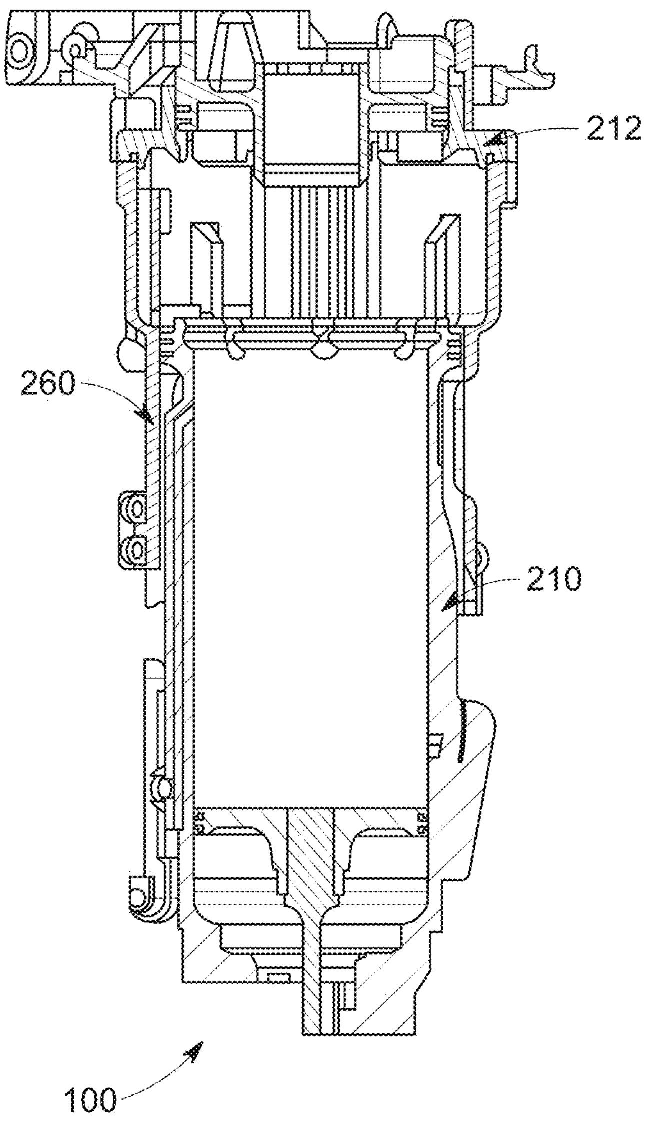
FIG. 5 is a fragmentary partial cross-sectional view of the fastener-driving tool of FIG. 1 that is in a fired state with the chamber member in the sealed position, the piston is fully driven and starting to move back toward the retracted position, and the chamber member retaining assembly is in the active state with the electromagnet energized.

As indicated above, FIGS. 1, 2, 3, 4 and 5 generally illustrate the operation of the tool 100 through the fastener-driving cycle. FIG. 2 shows the tool 100 in a rest state with the chamber member 260 in an unsealed position and the piston 220 in a fully retracted position. FIG. 3 shows the tool 100 in a ready to fire state with the chamber member 260 in a sealed position and the piston 220 in a fully retracted position. FIG. 4 shows the tool 100 in a fired state with the chamber member 260 in the sealed position and the piston 220 in a partially driven position. FIG. 5 shows the tool 100 in a fired state with the chamber member 260 in the sealed position, the piston 220 in fully driven and starting to move back toward its retracted position, and retaining the chamber member 260 in a retained position.

Figure 12:
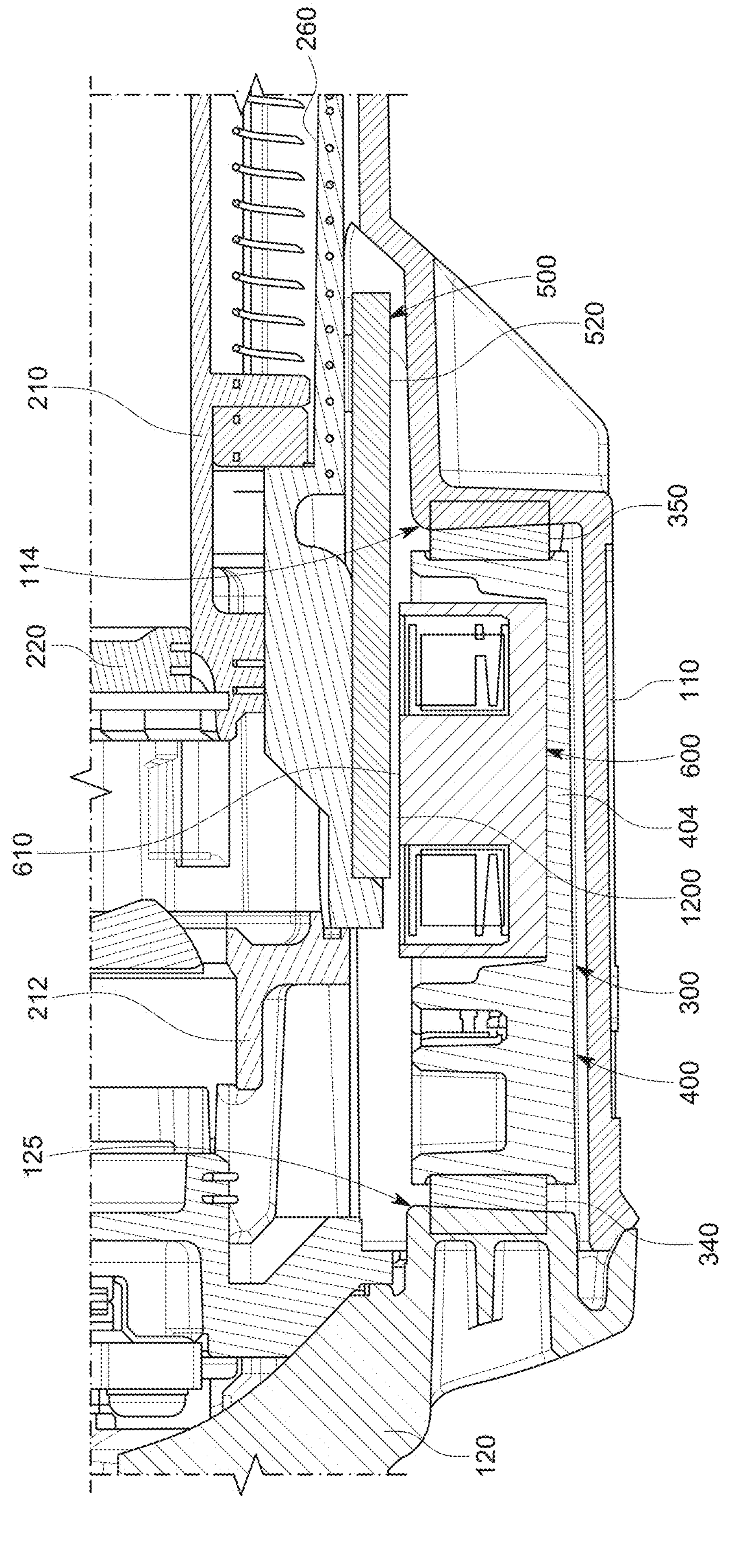
FIG. 12 is a fragmentary partial cross-sectional view of part of the combustion-powered fastener-driving tool of FIG. 6, showing the function of the chamber member retaining assembly while the tool is in a rest state with the chamber member in an unsealed position, the piston in a fully retracted position, and the chamber member retaining assembly in an inactive state.
Figure 13:
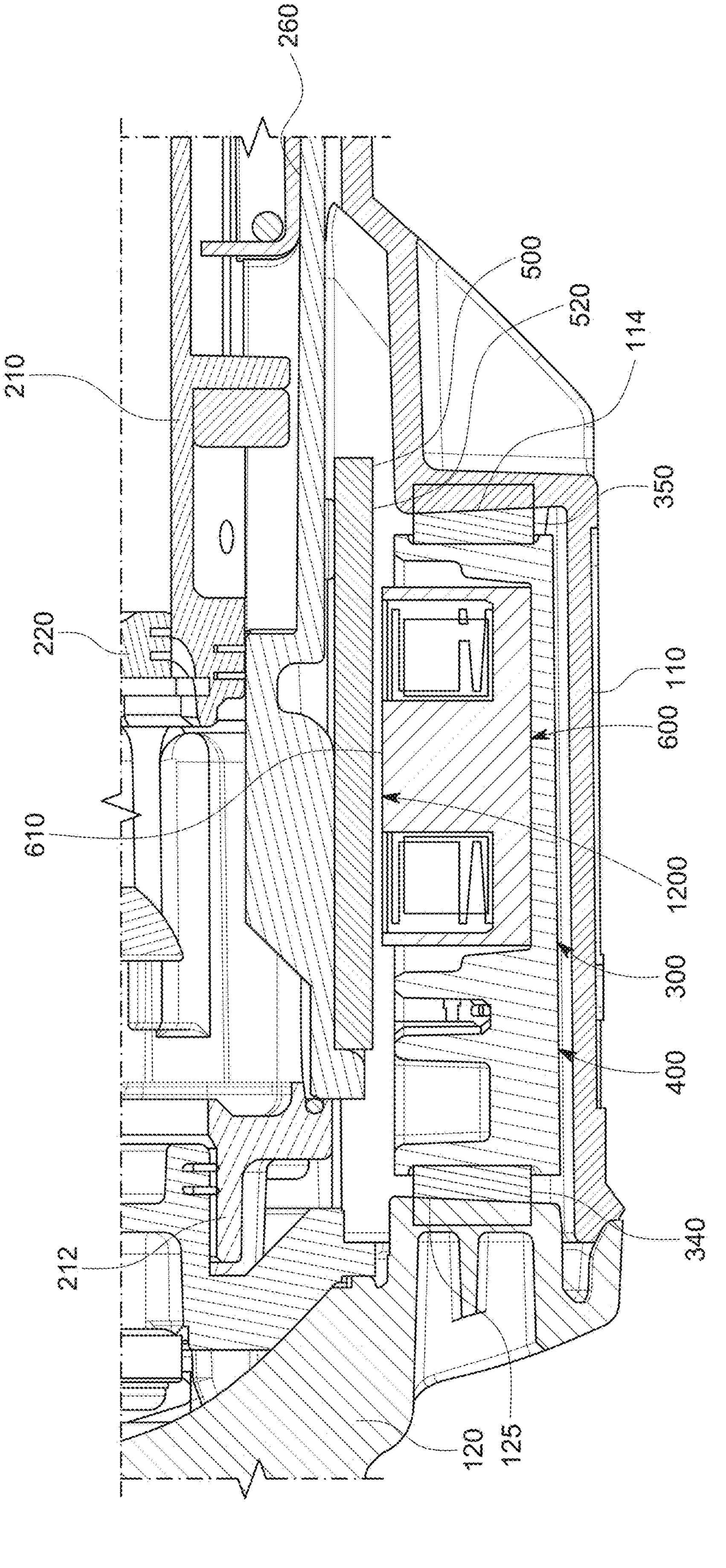
FIG. 13 is a fragmentary partial cross-sectional view of part of the combustion-powered fastener-driving tool of FIG. 6, showing the function of the chamber member retaining assembly while the tool is in a ready to fire state with the chamber member in a sealed position, the piston in a fully retracted position, and the chamber member retaining member in an inactive state.
Figure 14:
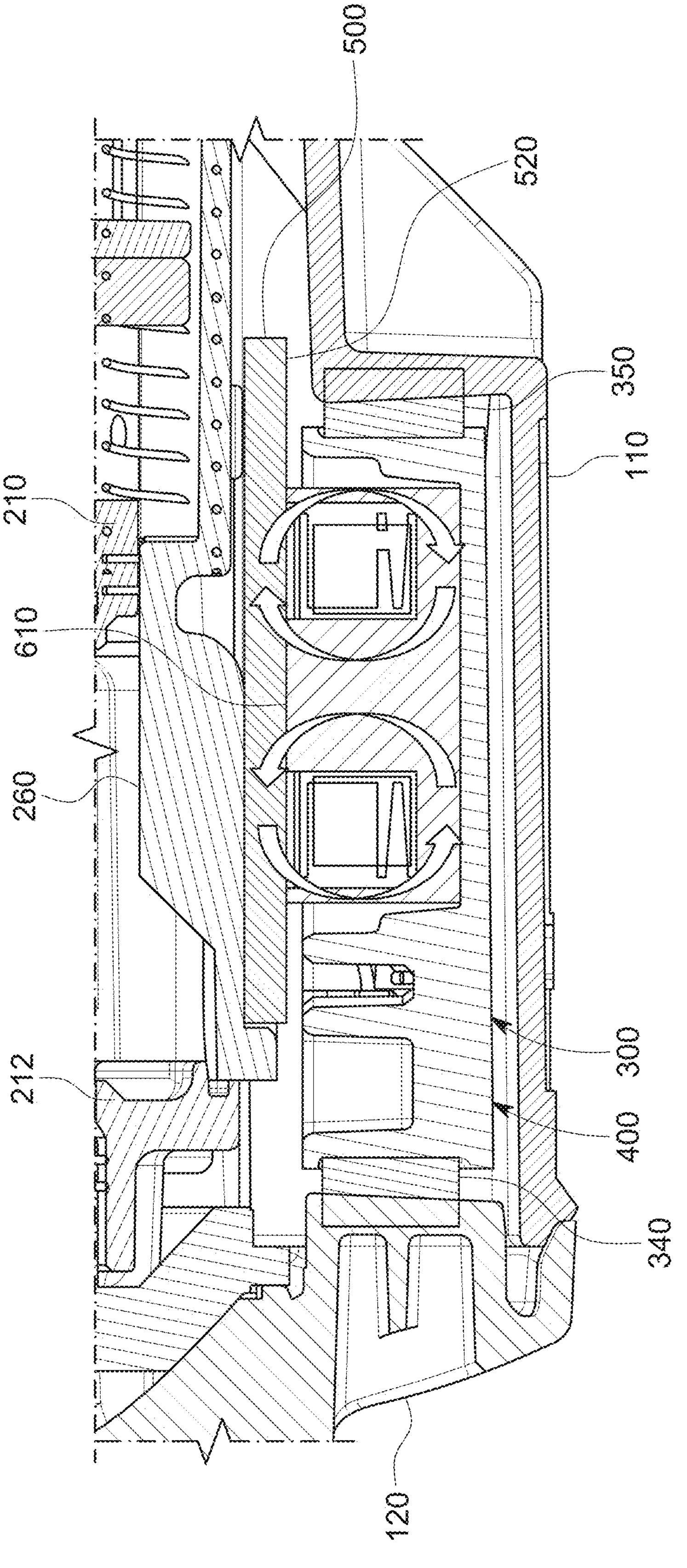
FIG. 14 is a fragmentary partial cross-sectional view of the combustion-powered fastener-driving tool of FIG. 6, showing the function of the chamber member retaining assembly while the tool is in a fired state with the chamber member in the sealed position and the electromagnet energized.

FIGS. 12, 13, and 14 more specifically illustrate the operation of the chamber member retaining assembly 280 through these states of the fastener-driving cycle.

FIG. 12 shows the tool 100 in a rest state with the chamber member 260 in an unsealed position, the piston 220 in a fully retracted position, and the chamber member retaining assembly 280 in an inactive state. The electromagnet assembly 600 is deenergized and an air gap 1200 is present between the inner face 610 of the electromagnet assembly 600 and the outer face 520 of the plate 500.

FIG. 12 also shows the inner cap surface 125 of the cap 120 and the inner pocket surface 114 of the cartridge pocket 112 of the housing 110. As illustrated, the inner cap surface 125 and the inner pocket surface 114 are not perpendicular to the inner face of the cartridge 400. Instead, the inner cap surface 125 and the inner pocket surface 114 are sloped in opposing directions, such that their respective surfaces are progressively further apart as they progress in a transverse direction from the cartridge inner face toward the cartridge body base wall 404. When the cartridge assembly 300 is assembled in the housing 110 of the tool 100 and the first and second cartridge connectors 340 and 350 are compressed, the angled surfaces of the inner cap and the inner pocket surface tend to bias the cartridge assembly 300 away from the plate 500 in the transverse direction.

FIG. 13 shows the tool 100 in a ready to fire state with the chamber member 260 in a sealed position, the piston 220 in a fully retracted position, and the chamber member retaining assembly 280 in the inactive state. The electromagnet assembly 600 is deenergized and the air gap 1200 is present between the inner face 610 of the electromagnet assembly 600 and the outer face 520 of the plate 500.

FIG. 14 shows the tool 100 in a fired state with the chamber member 260 in the sealed position, the piston 220 in a partially driven position, and the chamber member retaining assembly 280 in an active state with the chamber member 260 in a retained position. The electromagnet assembly 600 is energized, causing an electromagnetic attractive force between the electromagnet assembly 600 and the plate 500 in a direction transverse to the axial direction in which the piston 230, the chamber member 260, and the plate 500 move. This transverse attractive force causes the first and second cartridge connectors 340 and 350 to flex, allowing the cartridge assembly 300 to move inwardly toward the plate 500 until the inner surface 610 of the electromagnet assembly 600 contacts the outer face 520 of the plate 500, eliminating the air gap 1200. In this position, the transverse attractive force causes a friction force between the inner surface of the electromagnet assembly 600 that contacts the outer face 520 of the plate 500, preventing the chamber member 260 from moving in the axial direction and thus keeping the combustion chamber closed until the piston fully returns to its pre-firing position. The transverse attractive force and the resulting friction force remain in effect until the electromagnet assembly 600 is deenergized, which allows the chamber member 260 to return to its fully inactive position.

In various embodiments, the controller includes a processing device (or devices) communicatively connected to a memory device (or devices). For instance, the controller can be a programmable logic controller. The processing device can include any suitable processing device such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device can include any suitable memory device such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processing device to control operation or part of the operation of the tool 100. The controller is communicatively and operably connected to the electromagnet.

In other example embodiments, when the proper time delay has elapsed, the controller causes current to flow to the coil of the electromagnet in an opposite direction causing a de-gaussing effect. This opposing flux momentarily negates the transverse magnetic force, allowing the chamber member 260 to move in the axial direction and return to its starting position.

Figure 15:
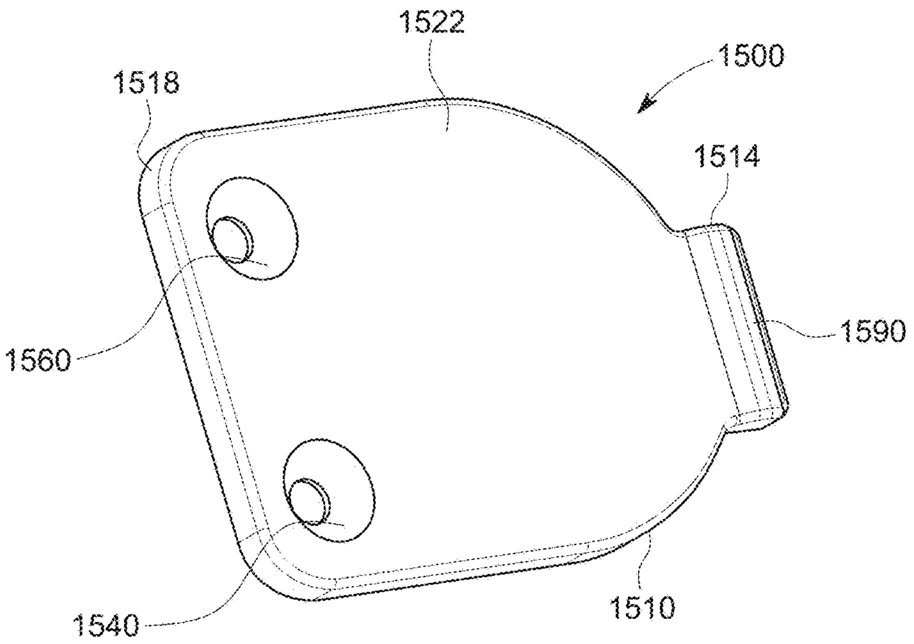
FIG. 15 is an enlarged outer perspective view of an alternative plate of the chamber member retaining assembly in accordance with another example embodiment of the present disclosure.
Figure 16:
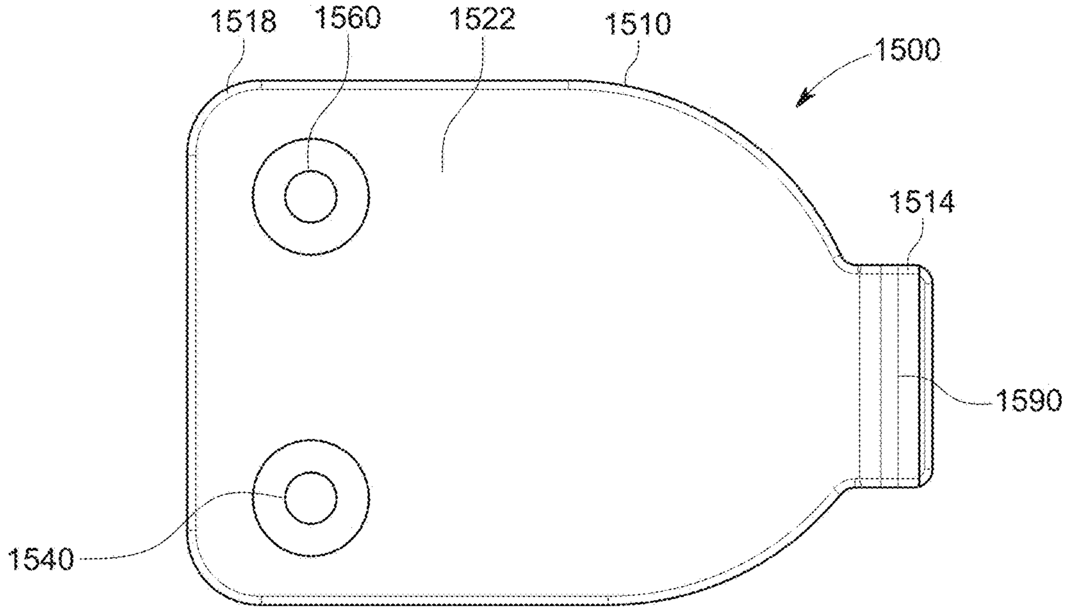
FIG. 16 is an enlarged outer view the alternative plate of FIG. 15.
Figure 17:
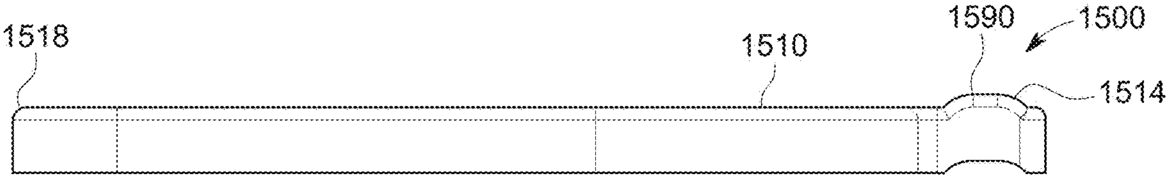
FIG. 17 is an enlarged edge view the alternative plate of FIG. 15.

FIGS. 15, 16, and 17 illustrate an alternative plate 1500 in accordance with another example embodiment of the present disclosure. This alternative plate 1500 facilitates release of the electromagnet assembly 600 from the plate 1500 and thus the chamber member. This plate 1500 includes a body 1510 that includes an outer face 1522, a nose 1514, and a tail 1518. The body 1510 of the plate 1500 defines a first mounting hole 1540 and a second mounting hole 1560, each configured to receive a respective suitable fastener (not shown in FIG. 15, 16, or 17). The first mounting hole 1540 and second mounting hole 1560 are located toward the tail 1518 of the body 1510 of the plate 1500. The first mounting hole 1540 and second mounting hole 1560 are each countersunk on the outer face 1522 of the body 1510 of the plate 1500 to accept the head of the respective fastener such that the head of the fastener remains below (sub-flush) to the outer face 1522 of the plate 1500. The body 1510 of the plate 1500 is made from a ferrous material in this embodiment. In this example embodiment, the ferrous material is steel. Other suitable ferrous materials can be employed for the plate in accordance with the present disclosure. The plate can be alternatively sized, shaped, positioned, and otherwise configured in accordance with the present disclosure.

This example alternative plate 1500 includes a transversely extending release member such as a release bump 1590 that is configured to assist in the release of the electromagnet assembly 600 from the plate 1500 when the electromagnet is de-energized. For example, when the electromagnet is de-energized and the chamber member 260 starts to open, the release bump creates a mechanical engagement with the cartridge and/or the electromagnet to facilitate release of the engagement between the electromagnet and the plate 1500. It should be appreciated that the release member can be otherwise sized, shaped, and configured in accordance with the present disclosure. It should also be appreciated that multiple release members can be employed in accordance with the present disclosure.

Various modifications to the above-described embodiments will be apparent to those skilled in the art. These modifications can be made without departing from the spirit and scope of this present subject matter and without diminishing its intended advantages. Not all of the depicted components described in this disclosure may be required, and some implementations may include additional, different, or fewer components as compared to those described herein. Variations in the arrangement and type of the components; the shapes, sizes, and materials of the components; and the manners of attachment and connections of the components may be made without departing from the spirit or scope of the claims set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A combustion-powered fastener-driving tool comprising:

a housing;

a controller supported by the housing;

a chamber member supported by the housing and movable relative to the housing from an unsealed position at which the chamber member does not seal a combustion chamber to a sealed position at which the chamber member seals the combustion chamber; and a chamber member retaining assembly within the housing and including:

an electromagnetic cartridge assembly including:

a cartridge, an electromagnet connected to and supported by the cartridge, the electromagnet controlled by the controller and activable to limit movement of the chamber member from the sealed position to the unsealed position, a first cartridge connector connected to the cartridge, and a second cartridge connector connected to the cartridge.

2. The combustion-powered fastener-driving tool of claim 1, wherein the controller is configured to energize the electromagnet for a period of time to maintain the chamber member in the sealed position to provide sufficient time for a piston supported by the housing to return to a pre-firing position.

3. The combustion-powered fastener-driving tool of claim 1, wherein the sealed position of the chamber member is closer to the electromagnet than the unsealed position of the chamber member.

4. The combustion-powered fastener-driving tool of claim 1, which includes a ferrous plate connected to the chamber member.

5. The combustion-powered fastener-driving tool of claim 4, wherein the electromagnet limits the movement of the chamber member by generating an attractive force between the ferrous plate and the electromagnet when the electromagnet is energized.

6. The combustion-powered fastener-driving tool of claim 5, wherein the chamber member is movable in an axial direction from the unsealed position to the sealed position and the attractive force acts in a transverse direction to the axial direction.

7. The combustion-powered fastener-driving tool of claim 5, wherein the chamber member is movable in an axial direction from the unsealed position to the sealed position and the attractive force acts in the axial direction.

8. The combustion-powered fastener-driving tool of claim 4, wherein the first cartridge connector and the second cartridge connector are each formed from a resilient compressible material.

9. The combustion-powered fastener-driving tool of claim 8, wherein the cartridge is moveable in both the axial and transverse directions.

10. The combustion-powered fastener-driving tool of claim 9, wherein the cartridge is biased by the first cartridge connector and second cartridge connector away from the ferrous plate.

11. The combustion-powered fastener-driving tool of claim 10, wherein an air gap exists between the electromagnet and the ferrous plate when the electromagnet is not energized.

12. The combustion-powered fastener-driving tool of claim 11, wherein the cartridge moves toward the ferrous plate when the electromagnet is energized.

13. The combustion-powered fastener-driving tool of claim 4, wherein the electromagnet limits movement of the chamber member by generating an attractive force between the chamber member and the ferrous plate.

14. The combustion-powered fastener-driving tool of claim 13, wherein the chamber member is not movable in an axial direction from the sealed position to the unsealed position when the attractive force acts in a transverse direction perpendicular to the axial direction.

15. The combustion-powered fastener-driving tool of claim 1, wherein the first cartridge connector and the second cartridge connector are each formed from a resilient material.

16. The combustion-powered fastener-driving tool of claim 15, wherein the cartridge is moveable in both axial and transverse directions relative to the chamber member.

17. The combustion-powered fastener-driving tool of claim 16, wherein the cartridge is biased by the first cartridge connector and second cartridge connector to axially move away from the chamber member.

18. The combustion-powered fastener-driving tool of claim 17, wherein in the unsealed position, an air gap exists between the electromagnet and a plate connected to the chamber member.

19. The combustion-powered fastener-driving tool of claim 18, wherein the cartridge is movable toward the chamber member when the electromagnet is energized and the chamber member is in the sealed position.

20. A combustion-powered fastener-driving tool, comprising:

a housing;

a controller supported by the housing;

a chamber member supported by the housing and movable relative to the housing from an unsealed position at which the chamber member does not seal a combustion chamber to a sealed position at which the chamber member seals the combustion chamber; and a chamber member retaining assembly supported by the housing and including:

a plate with an inner face and an outer face; and an electromagnetic assembly, with another inner face and another outer face, including:

a cartridge, and an electromagnet connected to and supported by the cartridge, the electromagnet controlled by the controller and activable to limit movement of the chamber member from the sealed position to the unsealed position, wherein, in the unsealed position, an air gap is present between the another inner face of the electromagnetic cartridge assembly and the outer face of the plate, and wherein, in the sealed position, the another inner face of the electromagnetic assembly contacts the outer face of the plate, eliminating the air gap.

* * * * *